United States Patent [19]

Holland et al.

[11] 4,322,049
[45] Mar. 30, 1982

[54] BARBEQUE GRILL MOUNTING BRACKET

[75] Inventors: Mason P. Holland, Columbus, Ga.; Lester E. Taylor, Phenix City; James W. Branch, Smiths, both of Ala.

[73] Assignee: W. C. Bradley Co., Columbus, Ga.

[21] Appl. No.: 778,485

[22] Filed: Mar. 17, 1977

[51] Int. Cl.³ ............................................. A47J 37/07
[52] U.S. Cl. .................................. 248/154; 126/25 R; 248/287; 248/312.1; 248/507
[58] Field of Search ............... 248/154, 124, 125, 129, 248/201, 202, 287, 311.1, 452, 488, 507, 508, 510; 126/25 R, 41 R; 280/79.1, 79.2

[56] References Cited

U.S. PATENT DOCUMENTS

| | | | |
|---|---|---|---|
| 229,306 | 6/1880 | Cummins | 248/202 |
| 943,871 | 12/1909 | Gimbel | 248/202 |
| 2,526,009 | 10/1950 | Daniels | 248/154 |
| 2,717,706 | 9/1955 | Yow et al. | 248/129 |
| 2,920,853 | 1/1960 | Bufogle | 248/287 |
| 2,987,832 | 6/1961 | Urbain et al. | 248/201 |
| 3,554,573 | 1/1971 | Miller | 248/154 |
| 3,627,244 | 12/1971 | Nicholas | 248/279 |
| 3,789,822 | 2/1974 | Schantz et al. | 126/41 R |
| 3,892,315 | 7/1975 | Johnson | 248/125 |

FOREIGN PATENT DOCUMENTS 60882   5/1943   Denmark ........................ 248/311.1

*Primary Examiner*—Roy D. Frazier
*Attorney, Agent, or Firm*—Newton, Hopkins & Ormsby

[57] ABSTRACT

A gas fired barbecue grill includes a base to which are attached a pair of positioning and support brackets for the lower ring of a propane gas tank. A vertical support post for the grill body rising from the base carries a two part adjustable stabilizing bracket which engages an upper ring of the gas tank to hold it in proper fixed relationship to the support post.

4 Claims, 6 Drawing Figures

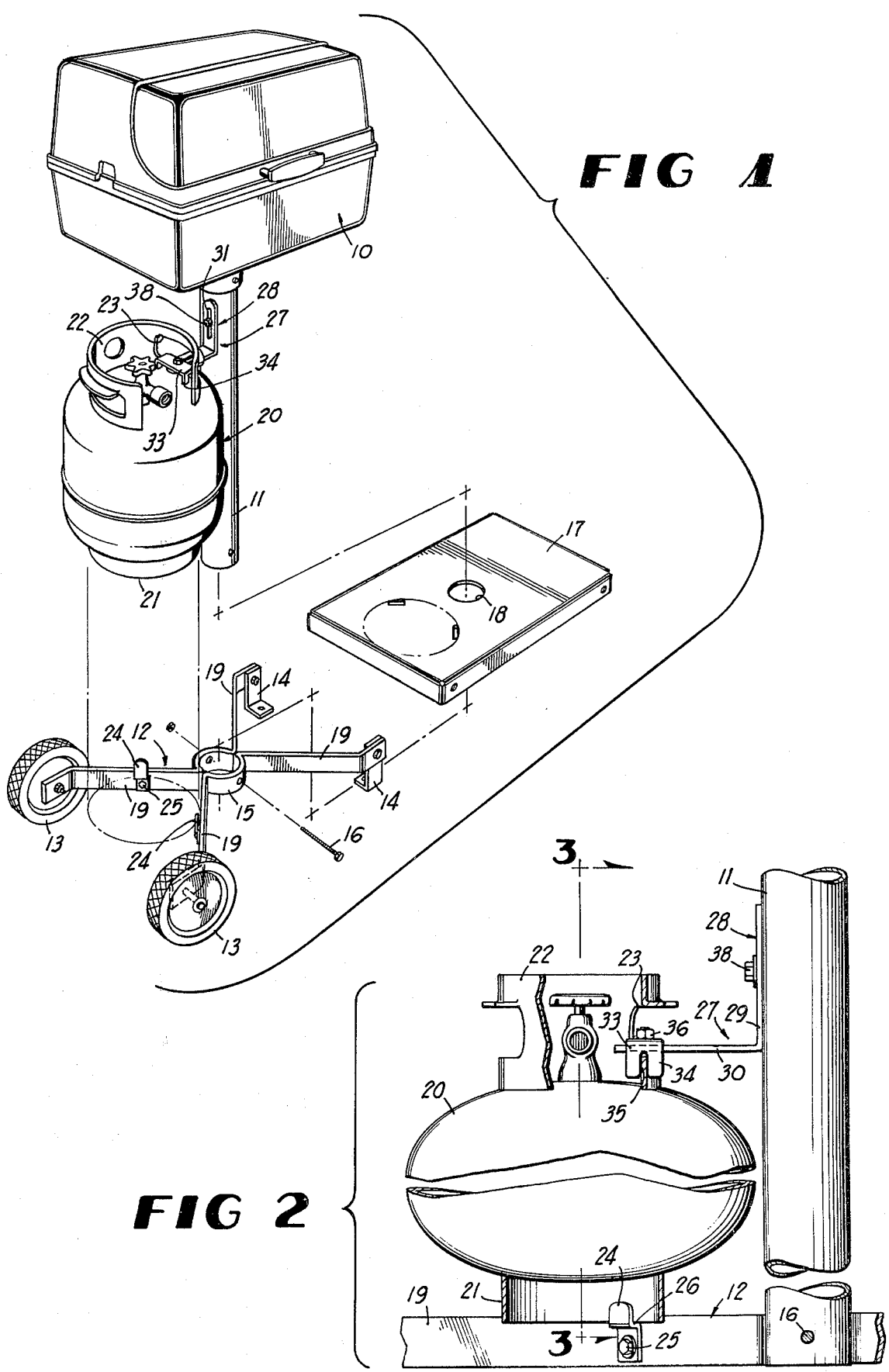

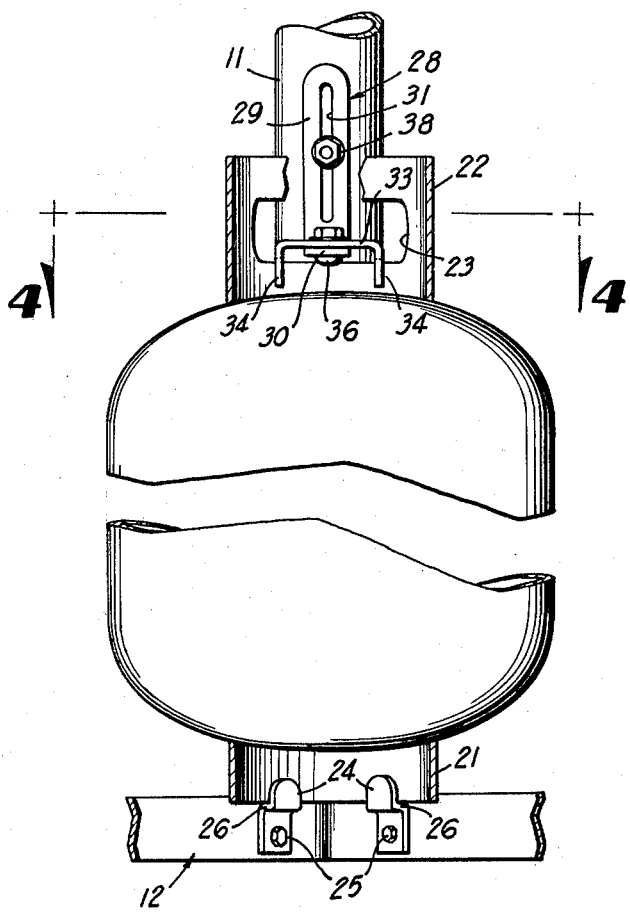
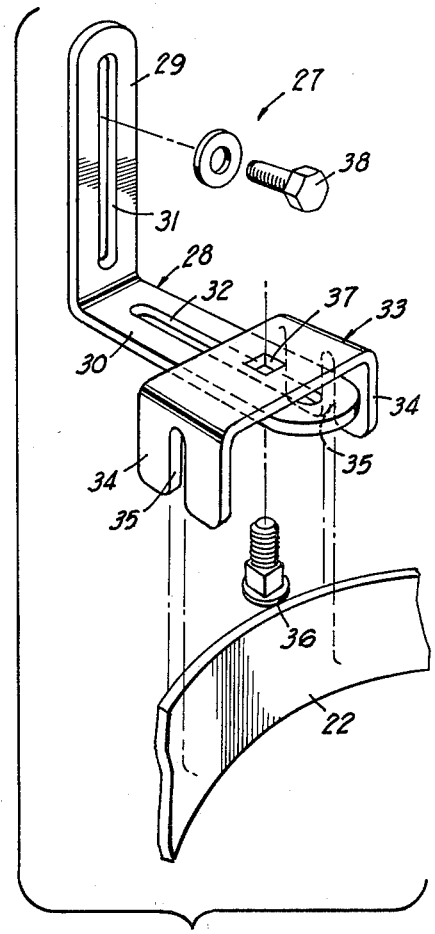
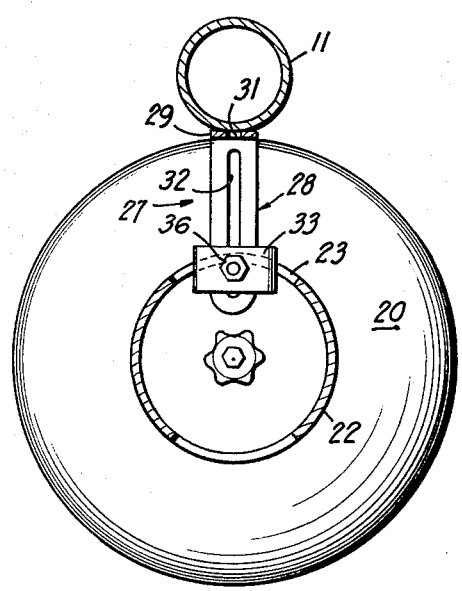
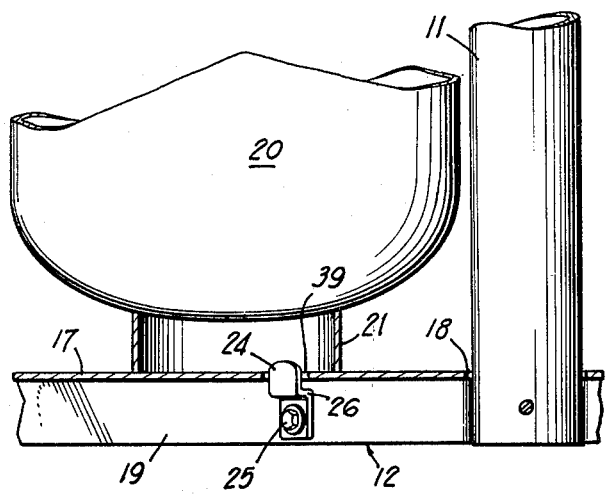
FIG 3
FIG 5
FIG 4
FIG 6

BARBEQUE GRILL MOUNTING BRACKET

BACKGROUND OF THE INVENTION

Gas fired barbecue grills and cookers are well known in the art including some which are supplied with low pressure propane gas from portable bottles or tanks. Some prior art patents contain teachings for attaching gas tanks to barbecue grills in various ways. Some examples of the patented prior art are U.S. Pat. Nos. 3,139,879; 3,294,079; 3,410,261; 3,789,822 and 3,915,146.

The objective of the present invention is to improve on the prior art arrangements by provision of a support and stabilizing means for propane gas tanks on gas fired barbecue grills, which means is less awkward, considerably more simplified, more economical to manufacture and much more convenient to install and use than comparable prior art proposals. According to the invention, a lower ring common to most propane fuel tanks is positioned and supported on two simple brackets attached to divergent legs of a horizontal wheeled base for the barbecue grill. These two brackets are able to accommodate lower tank rings of various sizes. A top apertured ring also found on most propane tanks is engaged by a slotted bracket section of an upper two part and two way adjustable tank stabilizing bracket assembly which is anchored to the vertical post or standard of the barbecue grill near and below the grill body. The adjustable upper bracket can also accommodate different sizes of tanks. The construction of the bracket means is extremely simple and inexpensive compared to prior art arrangements and the bracket means is structured to attach to the fuel tanks without the necessity for drilling, cutting or otherwise defacing the tank. The invention is extremely reliable and safe in its supporting and stabilizing of the relatively heavy fuel tank.

Other features and advantages of the invention will become apparent during the course of the accompanying detailed description.

BRIEF DESCRIPTION OF THE DRAWINGS

FIG. 1 is an exploded perspective view of the invention with non-essential parts omitted.

FIG. 2 is a fragmentary compressed side elevational view of the invention, partly in section.

FIG. 3 is a fragmentary vertical section taken on line 3—3 of FIG. 2.

FIG. 4 is a horizontal section taken on line 4—4 of FIG. 3.

FIG. 5 is an exploded perspective view of an upper two-part, two way adjustable tank stabilizing bracket assembly.

FIG. 6 is a fragmentary side elevation according to a slight modification of the invention.

DETAILED DESCRIPTION

Referring to the drawings in detail, wherein like numerals designate like parts throughout, the numeral 10 designates the body of a conventional gas fired barbecue grill having a vertical tubular support post 11 and a horizontal base 12 equipped with a pair of wheels 13 and a pair of feet 14. A center ring portion 15 of the base 12 receives the lower end of the cylindrical post 11 and is secured thereto by a through bolt 16, as illustrated. The base of the barbecue grill has an optional sheet metal cover 17 including a center opening 18 for the post 11, and this cover will be discussed later in the description as a modification of the invention. The base 12, as best shown in FIG. 1, has horizontal divergent forward and rear arms 19 carrying the wheels 13 and feet 14.

A conventional propane gas tank 20 is utilized on the gas fired grill and is generally of cylindrical form on the vertical axis and includes a rigid bottom ring 21 and a partial top ring 22 having a side wall opening 23 therein.

The invention proper for adapting the grill to the supporting and stabilizing of the tank 20 in a secure and simple manner comprises the following element. A pair of stepped brackets 24 on the forward arms 19 of the base 12 are attached to the inner sides of the arms by bolts 25. The brackets 24 extend above the arms 19 and their horizontal step portions 26 support the lower edge of the ring 21 with the wall of the ring disposed between the arms 19 and the vertical portions of the two support brackets. The arrangement will accept tank rings 21 of several sizes, and, if need be, the support brackets 24 may be mounted adjustably on the two arms 19 by providing the latter with additional bolt openings.

The invention further comprises an upper two-part two-way adjustable tank stabilizing bracket assembly 27 including a first bracket component 28 which is L-shaped and includes a vertical arm 29 and a horizontal arm 30. The arms 29 and 30 each have longitudinal slots 31 and 32, as indicated.

A second component of bracket assembly 27 is indicated by the numeral 33 and is approximately U-shaped with a top horizontal web resting on the arm 30 and a pair of side vertical webs 34 straddling the arm 30 and spaced therefrom in assembly. The side webs 34 have downwardly opening slots 35 formed therein which engage over the edge portion of the upper ring 22 defined by the bottom of the opening 23, see FIG. 2.

The bracket component 33 is connected adjustably to the horizontal arm 30 of component 28 by a carriage head bolt 36 whose square shank portion enters a square opening 37 in the horizontal web of bracket component 33, the bolt extending through the slot 32 adjustably and being secured by a suitable nut, as shown. Another bolt means 38 engages through the vertical slot 31 and is received by a threaded opening in the support post 11. In this manner, the entire bracket assembly 27 can be raised and lowered on the post 11 and locked by the bolt 38 at the selected elevation. The component 33 can similarly be adjusted horizontally on the arm 30 and locked by the bolt 36 and its nut in a selected position. These adjustments of the upper bracket assembly allow it to accommodate gas tanks of various sizes with upper rings 22 of differing diameters. As best shown in FIGS. 1 and 3, the opening 23 of the upper ring 22 is utilized for the entry of the bracket arm 30 and the component 33 into holding engagement with the ring 22 by virtue of the slots 35.

While the lower stepped brackets 24 securely hold the weight of the tank 20, the two-way adjustable upper bracket assembly 27 securely stabilizes the top of the tank through engagement with the upper ring 22, as described. The invention is simplified, economical to manufacture and install, extremely strong, and readily adjustable. Its advantages over the prior art should now be apparent to those skilled in the art.

A slight modification of the invention is illustrated in FIG. 6, wherein the described optional cover 17 is shown. This cover has a pair of angled slots 39 formed therethrough and adapted to receive the tops of the two support brackets 24 with the latter mounted on the arms 19 exactly as described. In this situation, the brackets 24 project somewhat above the top of the cover 17 and may enter the interior of the lower ring 21 to center and position it. However, the weight is supported by the top of the cover 17, FIG. 6, instead of by having the lower ring 21 rest directly on the steps 26 of brackets 24. In other respects, the invention is exactly the same as shown and described in FIGS. 1 through 5.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A device for mounting a fuel tank securely and removably on a gas-fired barbecue grill, said grill having an upright support member rising from a substantially horizontal base, said fuel tank having top and bottom vertical axis rings, said device comprising a pair of spaced fuel tank support and positioning bracket elements secured to said horizontal base and spaced from said upright support member and including step portions engaging under the lower edge of the bottom tank ring and supporting the weight of the tank and upstanding portions projecting inside of the bottom tank ring to position the tank horizontally relative to the upright support member, and an upper tank positioning and stabilizing bracket assembly including a first substantially L-shaped bracket part secured to the side wall of the upright support member and projecting laterally therefrom and a second substantially inverted U-shaped bracket part secured to the first bracket part and engaging the top tank ring, means connecting said first and second bracket parts for adjustment laterally relative to the upright support member, and means connecting the first bracket part with the upright support member for vertical adjustment thereon.

2. A device for mounting a fuel tank securely and removably on a gas-fired barbecue grill as defined in claim 1, and said first L-shaped bracket part including vertical and horizontal arms which are longitudinally slotted, and said first and last named means comprising screw-threaded fastener means engaging through the slots of said vertical and horizontal arms of said first L-shaped bracket part.

3. A device for mounting a fuel tank securely and removably on a gas-fired barbecue grill as defined in claim 1, and said second inverted U-shaped bracket part having side walls provided with downwardly open slots which engage over the upper edge of the tank top ring at two circumferentially spaced points on the top ring.

4. A device for mounting a fuel tank securely and removably on a portable gas-fired barbecue grill, said grill having a substantially horizontal base and an upright support member rising from the base, said fuel tank having top and bottom vertical axis rings thereon, said device comprising spaced support and positioning elements for the bottom tank ring on said horizontal base and engaging the bottom tank ring at circumferentially spaced points and supporting the weight of the fuel tank, and an upper two component tank positioning and stabilizing bracket assembly including a first component secured to the upright support member and being vertically adjustable thereon and lockable in a selected adjusted position and a second component secured to the first component and being horizontally adjustable thereon toward and away from the upright support member and lockable in a selected adjusted position engaging the top tank ring, said second component having a pair of spaced depending side extensions which are vertically slotted to engage over the top tank ring at two circumferentially spaced points on the ring.

* * * * *